US008810900B2

(12) United States Patent
Shabanov et al.

(10) Patent No.: US 8,810,900 B2
(45) Date of Patent: Aug. 19, 2014

(54) GENERATION OF HIGHER HARMONICS OF MONOCHROMATIC ELECTROMAGNETIC RADIATION

(75) Inventors: Sergei V. Shabanov, Gainesville, FL (US); Remy Friends Ndangali, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 57 days.

(21) Appl. No.: 13/479,212

(22) Filed: May 23, 2012

(65) Prior Publication Data

US 2012/0300286 A1 Nov. 29, 2012

Related U.S. Application Data

(60) Provisional application No. 61/488,971, filed on May 23, 2011.

(51) Int. Cl.
*G02F 1/37* (2006.01)

(52) U.S. Cl.
USPC .......................................................... 359/328

(58) Field of Classification Search
USPC ................................................ 359/326–332
See application file for complete search history.

(56) References Cited

PUBLICATIONS

Xu et al., "Third-harmonic generation from arrays of sub-wavelength metal apertures", Dec. 9, 2009, Optics Express, vol. 17, No. 26, pp. 1-7.*

D.C. Marinica, A.G. Borisov, S.V. Shabanov, Bound States in the Continuum in Photonics, Phys. Rev. Lett. 100, 183902 (May 2008).
G. D. Boyd and D. A. Kleinman, Parametric Interaction of Focused Gaussian Light Beams, AIP of Applied Physics vol. 39, No. 8, Jul. 1968.
D. C. Marinica, et al., Second harmonic generation from arrays of subwavelength cylinders, Physical Review B 76, 085311 (Dec. 2007).
Ajay Nahata, et al., Enhanced nonlinear optical conversion from a periodically nanostructured metal film, Mar. 15, 2003 / vol. 28, No. 6 / Optics Letters.
S.V. Shabanov, Resonant light scattering and higher harmonic generation by periodic subwavelength arrays, Int. J. Mod. Phys. B 23, 5191-5239 (Oct. 2009).
R.F. Ndangali, S.V. Shabanov, Electromagnetic bound states in the radiation continuum for periodic double arrays of subwavelength dielectric cylinders, J. Math. Phys. 51, 102901 (Oct. 2010).

* cited by examiner

*Primary Examiner* — Daniel Petkovsek
(74) *Attorney, Agent, or Firm* — Thomas|Horstemeyer, LLP.

(57) ABSTRACT

Various methods and systems are provided for generation of higher harmonics of monochromatic electromagnetic radiation. In one embodiment, among others, a system includes a double array of planar structures including a first periodically structured planar structure having a periodic spacing corresponding to a resonant frequency and a second periodically structured planar structure in parallel with the first structure. The system also includes a source configured to illuminate the first structure with a beam of monochromatic electromagnetic radiation at the resonant frequency to produce a higher harmonic of the monochromatic electromagnetic radiation. In another embodiment, a method includes directing a beam of monochromatic electromagnetic radiation at a resonant frequency at a double array of planar structures and generating a higher harmonic of the monochromatic electromagnetic radiation. The double array includes a first periodically structured planar structure and a second periodically structured planar structure in parallel with the first structure.

19 Claims, 3 Drawing Sheets

GENERATION OF HIGHER HARMONICS OF MONOCHROMATIC ELECTROMAGNETIC RADIATION

CROSS REFERENCE TO RELATED APPLICATIONS

This application claims priority to U.S. provisional application entitled "GENERATION OF HIGHER HARMONICS OF MONOCHROMATIC ELECTROMAGNETIC RADIATION" having Ser. No. 61/488,971, filed May 23, 2011, the entirety of which is hereby incorporated by reference.

BACKGROUND

The conventional way to generate a second harmonic of light uses a slab of optically non-linear crystal that is illuminated by a laser beam. For example, a beam produced by a diode laser has a wavelength of 980 nm (infrared light). It can be converted into a beam with the wavelength of 490 nm (green light) by transmitting the former through an optically non-linear crystal. The process is used in, e.g., a green-light laser pointer.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Disclosed herein are various embodiments of methods related to higher harmonic generation of monochromatic electromagnetic radiation. Reference will now be made in detail to the description of the embodiments as illustrated in the drawings, wherein like reference numbers indicate like parts throughout the several views.

Higher harmonics of light may be generated using a slab of optically non-linear material (e.g., a crystal) that is illuminated by a laser beam. For example, as the beam propagates through the slab, some of its radiation may be converted to that of the double frequency. This effect is due to the so called non-linear dielectric susceptibility.

A condition for the process to exist is the phase matching condition. The fundamental field of frequency $\omega$ must propagate through the slab of an optically non-linear material in phase with the generated field of the double frequency $2\omega$, otherwise the amplitude of the second harmonics oscillates and does not grow. The phase mismatch is due to a difference in the propagation speed of light of frequencies $\omega$ and $2\omega$ as the refraction index of the slab is typically frequency dependent. There are various techniques to cope with the problem. If the phase matching condition is fulfilled, then the amplitude of the second harmonic grows linearly with the distance traveled through the slab. In a practical set-up, the phase matching condition can only be fulfilled with a certain accuracy. At a certain distance the linear growth stops and no further amplification of the second harmonic is gained. The length (or distance) at which this occurs is an active length specific to the optically non-linear material.

Not all radiation of the incident beam gets converted to a double frequency. After passing through the slab of an active length, the exit beam is a mixture of two beams of frequencies $\omega$ and $2\omega$. Typically a prism placed after the slab is used to separate the single-frequency and double-frequency beams. If $P_\omega$ is the power per unit area of the incident beam, then the power per unit area of the generated double-frequency beam is $P_{2\omega}=\sigma_2 P_\omega$ where the coefficient $0 \leq \sigma_2 < 1$ is the conversion rate. The conversion rate is also specific to an optically non-linear material (assuming the phase matching condition is fulfilled).

A non-linear susceptibility is characterized by constants $\chi_n$, n=2, 3 ... for the frequency conversion $\omega \rightarrow n\omega$. Its physical significance is that if an electric field E is applied to a material, then the electric field in the material is $D=\in E$ where the dielectric constant $\in$ depends on the applied field E:

$$D = \varepsilon E = (\varepsilon_0 + \chi_2 E + \chi_3 E^2 + \ldots)E = \varepsilon_0\left(1 + \frac{\chi_2 E}{\varepsilon_0} + \frac{\chi_3 E^2}{\varepsilon_0} + \ldots\right)E \qquad \text{EQN. 1}$$

where $\in_0$ is the linear dielectric constant of the material. The second harmonic generation occurs if the constant $\chi_2$ is not zero for a given material. Although a nonlinear susceptibility $\chi_n$ is exhibited by many materials, it is typically tiny. As seen from the above equation, the physical parameters that govern optically nonlinear effects are:

$$v_2 = \frac{\chi_2 E}{\varepsilon_0}, v_3 = \frac{\chi_3 E^2}{\varepsilon_0} \text{ etc.} \qquad \text{EQN. 2}$$

meaning that the only way to amplify the effects is to increase the field amplitude E of the incident beam. In particular, to generate a second harmonic, the parameter $v_2$ should be high enough (e.g., $v_2 \geq 0.3$). The value achieved in modern devices depends upon the method used to generate the harmonic. For a typical light source, nonlinear effects are highly suppressed (i.e., $v_2 \ll 1$ and $v_3$ is usually even smaller). Among common light sources, lasers produce beams with the highest field amplitudes. But even laser beams cannot provide for a sufficiently large value of $v_2$ in many materials. This problem may be solved by focusing the incident beam to increase power per unit area.

In summary, features to generate higher harmonics include:

Fulfilling the phase matching condition. This condition is dictated by the fact that second harmonic generation occurs over an extend distance traveled by light (the active length), which is larger than the wavelength of the incident light by about four to five orders of magnitude.

An active length over which a significant conversion rate is observed varies in a millimeter to centimeter range, while a typical wavelength of the incident light is on the order of 1000 nm or $10^{-3}$ mm. So, if L is an active length and $\lambda$ is the wavelength of light, then the ratio L/$\lambda$ is between about $10^3$ and $10^4$. This parameter is a rough characteristic of the dimensions of a device to generate higher harmonics. Thus, all such devices are essentially macroscopic.

Focusing of the incident beam can improve the conversion rate $\sigma = P_{2\omega}/P_\omega$. A drawback of a tight focusing is that an optimization of the conversion rate $\sigma$ becomes a technically difficult problem.

The power conversion rate is typically less than 50%. Exceptional materials exist for which conversion rates above 80% have been reported.

Nanophotonics may also be utilized for higher harmonic generation of monochromatic electromagnetic radiation. Periodically structured films with a thickness substantially less than a wavelength of the incident radiation and periods slightly less than the wavelength have been known to exhibit an anomalous transmission and reflection properties, called Wood anomalies. Examples of such periodic structures are a film with a periodic pattern of holes or a film with periodically occurring slits (such structures are also called gratings). Such gratings have been examined in the centimeter and millimeter wave length range. Interest in studying such structures in visible light has increased in the past decade because of the advancements in manufacturing of such periodic structures at a nanoscale, i.e., when the periods of these structures are comparable with the wavelengths of visible light.

The features of scattering of light on periodically structured films are discussed in "Resonant light scattering and higher harmonic generation by periodic sub wavelength arrays" by S. V. Shabanov, International Journal of Modern Physics B, Volume 23, Issue 27, pp. 5191-5236 (2009), which is hereby incorporated by reference in its entirety. The features of scattering of light on periodically structured films include:

First, when the transmitted or reflected power is viewed as a function of the wavelength (or frequency) of the incident light, then it has a narrow peaks at particular wavelength slightly less than the period of the structure. These peaks are called scattering resonances. Their physical origin may be due to periodic geometry of the structure and to physical properties of structure material. Each resonance is characterized by its position, i.e., the wavelength $\lambda_r$ at which the peak occurs, called a resonant wavelength (or, accordingly, a resonant frequency $\omega_r$), by its resonant width $\Gamma$, which is the size of a frequency interval containing $\omega_r$ in which the scattered power exceeds half of its maximal value at $\omega_r$.

Second, when a periodic structure is illuminated with light of the resonant frequency $\omega_r$, there are regions in the structure in which the local field amplitude $E_r$ behaves as:

$$E_r = \frac{E_i}{\sqrt{\Gamma}} \qquad \text{EQN. 3}$$

where $E_i$ is the amplitude of the incident radiation. This implies that a narrow scattering resonance corresponds to high amplification of the field amplitude. In other words, structures that exhibit narrow resonances are capable of focusing the incident radiation at specific regions within the structure. If an optically nonlinear material is placed at such regions, optically nonlinear effects can be significantly amplified. This is especially interesting when the incident radiation is a laser beam, as no focusing is required to amplify optically nonlinear effects generated by laser radiation.

Third, the resonant width $\Gamma$ may be driven to zero by a mechanism based on the concept of bound states in radiation continuum, which was first noted in quantum mechanics by von Neumann and Wigner. The local field amplification and, hence, optically nonlinear effects may be regulated or controlled using the mechanism. By exploiting the similarity between the basic equations of quantum mechanics and those of electromagnetic theory, it can be shown that the phenomenon exists in electrodynamics. The phenomenon admits the following simple description. Suppose there is a periodically structured film which exhibits a scattering resonance at frequency $\omega_r$ with width $\Gamma$. Consider two such structures placed in parallel at a distance 2h. Using the Breit-Wigner resonant scattering theory, one can prove that:

The double-array structure has two resonances at frequencies $\omega_1(h)$ and $\omega_2(h)$ that depend on the distance h and lie in a neighborhood of $\omega_r$; the resonances have widths $\Gamma_1(h)$ and $\Gamma_2(h)$, which also depend on the distance h.

There always exists a critical distance $h_b$ at which either the width $\Gamma_1$ or $\Gamma_2$ vanishes, while the other width becomes $2\Gamma$, i.e.

$$\Gamma_1(h_b)=0, \Gamma_2(h_b)=2\Gamma \text{ or } \Gamma_1(h_b)=2\Gamma, \Gamma_2(h_b)=0 \qquad \text{EQN. 4}$$

The resonances with the vanishing width correspond to a new type of waveguide modes localized on the structure. In contrast to previously known waveguide modes (e.g., those in metal cavities or in defects in photonic crystals, etc.), they occur in the spectral range of scattered (diffracted) modes of the light. This explains the term "the bound states in the radiation continuum." When the distance h coincides with a critical value $h_b$, the mode cannot be excited by incident radiation. If h deviates slightly from $h_b$, the existence of such a mode in the structure causes a sharp scattering resonance with a nearly vanishing width. This feature is precisely due to the fact that the mode lies in the spectral range of scattering modes. Conventional waveguide modes do not lie in the spectral range of diffracted light and, hence, cannot cause resonances with a nearly vanishing width.

The mechanism to achieve a desired amplification of the local field amplitude is therefore based on the relation $$E_r = \frac{E_i}{\sqrt{\Gamma_n(h_b + \Delta h)}}, \; \omega = \omega_n(h_b + \Delta h), \; n = 1, 2 \qquad \text{EQN. 5}$$

where $\Delta h$ is a small deviation of the distance from the critical one $\Delta h = h - h_b$. As $\Delta h$ approaches zero, the amplitude $E_r$ in some regions of the structure grows as much as desired. If the material of the structure has a nonlinear susceptibility, then in the regions where the field amplification occurs when reducing the width $\Gamma_n$, the physical parameters governing the magnitude of optically nonlinear effects, e.g., $$v_2 = \frac{\chi_2 E_r}{\varepsilon} = \frac{\chi_2 E_i}{\varepsilon \sqrt{\Gamma_n(h_b + \Delta h)}} \qquad \text{EQN. 6}$$

can be made large enough by taking the distance h sufficiently close to the critical value $h_b$.

The smallest distance at which a resonance with the vanishing width occurs is about half of the period of the structure. The effect on a specific example of a double array structure was examined in "Electromagnetic bound states in the radiation continuum for periodic double arrays of sub wavelength dielectric cylinders" by R. F. Ndangali and S. V. Shabanov, Journal of Mathematical Physics, Volume 51, Issue 10, 102901 (2010), which is hereby incorporated by reference in its entirety. Since the period is about the wavelength of the incident radiation, the effect can be achieved at the total thickness of the structure being about the wavelength itself. This allows for enhanced optical non-linear effects at nanoscale and, thus, a miniaturization of optically nonlinear devices.

Figure 1A:
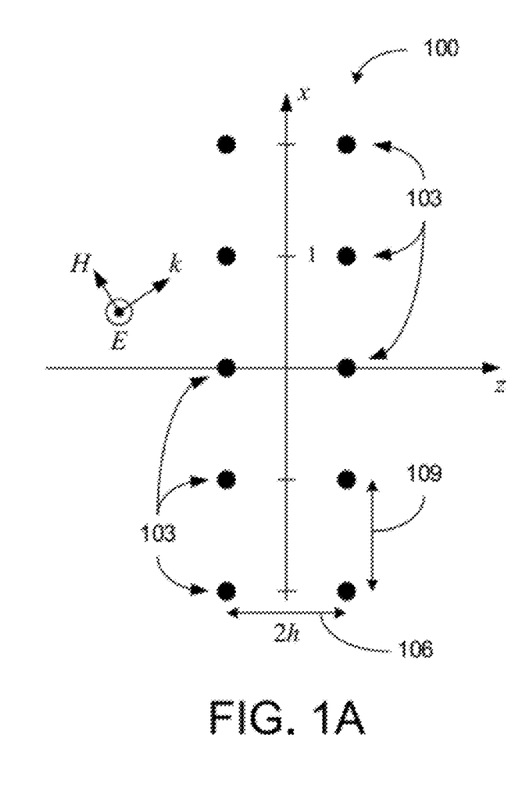
FIG. 1A is a cross-sectional view of an example of a double array of dielectric cylinders for generation of higher harmonics of monochromatic electromagnetic radiation in accordance with various embodiments of the present disclosure.

Referring now to FIG. 1A, shown is a cross-sectional view of an example of a double array 100 of sub wavelength dielectric cylinders 103 for generation of higher harmonics of monochromatic electromagnetic radiation in accordance with various embodiments of the present disclosure. The embodiment of FIG. 1A includes two arrays of parallel dielectric cylinders 103. The cylinders 103 are parallel to the y-axis, which is normal to the plane of FIG. 1A, and indicated by solid circles. The two arrays are separated by a distance 106 of 2h. All distances are measured in the units of the structure period 109 (i.e., the distance between the centers of two neighboring cylinders along the x-axis). The period has been normalized in the example of FIG. 1A. An incident plane wave is characterized by the wave vector k, and the electric field is parallel to the cylinders (the TM polarization). The magnitude of the wave vector k=|k| is related to the frequency as k=ω/c where c is the speed of light. So, the quantity k will be used in place of the frequency ω in the following discussion. The radius R of the cylinders is small as compared to the period, R<<1, and also satisfies the condition Rk<<1, i.e., the wave length λ is about the period of the structure and much larger than the cylinder radius because k=2π/λ so that Rk<<1 implies that R<<λ. For example, with R=0.08D, where D is the structure period (i.e., the distance between two neighboring cylinders in a single array) and λ about D, then R/λ=0.08. The direction of the incident wave is determined by the value of the x-component of the wave vector $k_x$, so that every wave in the system is defined by the pair (k, $k_x$). The normal incidence corresponds to $k_x$=0.

If D is the period of the structure, R is the radius of the cylinders, and 2h is the distance between the two arrays, then the conditions that have to be satisfied are: R/D<<1, R/h<<1, and the wavelength λ should be of order D or R/λ<<1 (an example is described in the previous paragraph). The length of cylinders is roughly determined by the incident (laser) beam diameter. The number of cylinders is roughly the beam diameter divided by the structure period. Thus, the geometrical parameters of the system are determined by the incident beam wavelength.

Figure 1B:
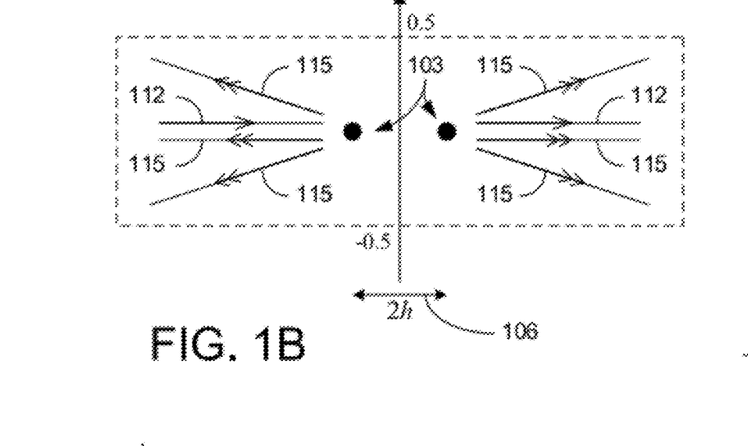
FIG. 1B is a graphical representation illustrating the scattering process exhibited by the cylinders of the double array of FIG. 1A in accordance with various embodiments of the present disclosure.

FIG. 1B is a graphical representation of the scattering process exhibited by cylinders 103 of the double array 100. With a normal incidence ($k_x$=0) of the wave, a wave of frequency ω=k/c has two scattering channels 112 indicated by rays with single arrow (one is transmitted and the other is reflected). The generated wave of the double frequency 2ω=2k/c has six scattering channels 115 indicated by double arrows (three transmission channels and three reflection channels).

Figure 1C:
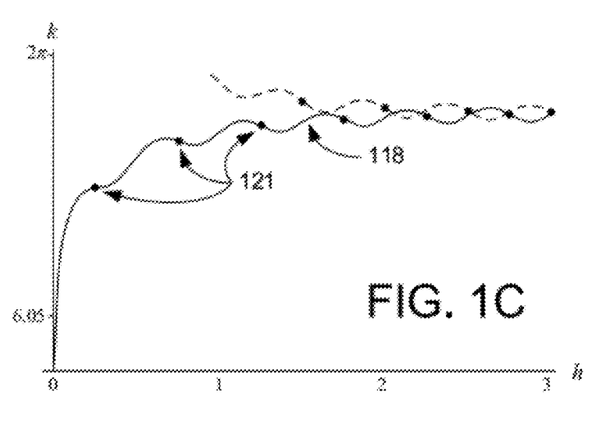
FIG. 1C is a plot illustrating examples of positions of resonances of the double array of FIG. 1A in accordance with various embodiments of the present disclosure.

The system has scattering resonances, as defined above, whose position (frequency) depends of the distance h and the incident angle or $k_x$. A resonance occurs at k=$k_r$(h, $k_x$). The solid curve 118 in FIG. 1C illustrates positions of resonances for normal incidence ($k_x$=0) as a function of h, i.e., k=$k_r$(h, 0). The dashed curve of FIG. 1C also corresponds to another set of resonances which will not be used in what follows.

The local field amplification due to a small resonance width, $E_r$=$E_i$/√Γ, occurs exactly on the cylinders, meaning that if the material of the cylinders has a non-linear susceptibility, the corresponding optical nonlinear effects will be enhanced, provided the width Γ can be made small enough.

The system admits resonances with a vanishing width, which occur at specific distances, as generally described above. The resonances with the vanishing width are indicated by solid dots 121 on the curve k=$k_r$(h, 0). Note that two such states exist in the interval 0<h<1. At least one of the states occurs when the distance between the two arrays does not exceed the structure period (which has been normalized to 1), i.e., when the distance is less than the wavelength of the incident radiation. In the example of FIG. 1C, the first two states occur at about h=0.26 (which corresponds to the distance 2h=0.52) and about h=0.75 (which corresponds to the distance 2h=1.5).

The dielectric response of the material of the cylinders may be characterized by a dielectric constant $\in_c$ and a second-order nonlinear susceptibility $\chi_c$. The standard nonlinear Maxwell's equations may be solved to find the scattered field of frequency ω and the generated field of frequency 2ω in the so called dipole approximation kR<<1 (which is justified by the geometry of the system). Using the solution, the power $P_{2ω}$ of the generated second harmonic transmitted across a unit area in the direction normal to the structure has been calculated. The conversion efficiency is defined above as $σ_2$=$P_{2ω}$/$P_ω$, where $P_ω$ is the power per unit area of the incident wave. It is a function of the distance h, the radius R, and the material constants $\in$ and $\chi_c$. The efficiency $σ_2$ has been optimized relative to the distance h. It has been proved that the maximal efficiency occurs when the distance satisfies the condition:

$$(h - h_b)^4 = \frac{\chi_c^2}{8\pi^5 k_b (k_b R)^6 (\varepsilon_c - 1)} \qquad \text{EQN. 6}$$

where $h_b$ is a distance at which a resonance with the vanishing width occurs (as shown in FIG. 1C), $k_b$=$k_r$($h_b$, 0) is the magnitude of the wave vector k at h=$h_b$ ($k_x$=0 for normal incidence), i.e. $ω_b$=$ck_b$ is the frequency at which a resonance with the vanishing width occurs.

The exact expression for the conversion rate $σ_2$ and its maximal value $σ_{2,max}$ attained at the distance defined by EQN. 6 may be shown as follows. If two identical periodic planar structures that have a scattering resonance at a frequency $ω_0$ with a width $Γ_0$ are positioned parallel at some distance 2h, then due to multiple scattering effects the combined system has two resonances at $ω_{1,2}$=$ω_{1,2}$(h) with the corresponding widths $Γ_{1,2}$=$Γ_{1,2}$(h) which depend on the distance h (and, of course, on $ω_0$ and $Γ_0$). For distances large enough to neglect contributions of evanescent fields to the multiple scattering, this dependence can be derived by means of the Breit-Wigner theory. The latter shows, in particular, the existence of localized modes between the two planar structures at some critical values h=$h_b$ defined by the conditions $Γ_1$($h_b$)=0 (whereas $Γ_2$($h_b$)=2$Γ_0$) or $Γ_2$($h_b$)=0 (whereas $Γ_1$($h_b$)=2$Γ_0$). For distances small enough so that contributions of evanescent fields in the multiple scattering effects cannot be neglected, a full solution of the scattering problem establishes the existence of bound states in the radiation continuum. For a system of two parallel arrays of periodically positioned sub wavelength dielectric cylinders (e.g., as depicted in FIG. 1A), the existence of bound states in the radiation continuum can be established in numerical studies of the system. A complete classification of bound states as well as their analytic form may be given where bound states exist in higher order diffraction channels, i.e. when more than one decay channel are open, which is quite unusual in resonant scattering theory because by tuning just a single physical parameter h a quasi-stationary state that otherwise decays into several open diffraction channels becomes stationary and decoupled from the radiation continuum.

One of the most interesting features of resonant scattering by planar sub wavelength periodic structures is the existence of "hot" spots within the region occupied by the structure where, for a narrow resonance, the field amplitude $E_r \sim E_i/\sqrt{\Gamma_0}$ is magnified as compared to the incident field amplitude $E_i$. In particular, for a single periodic array of sub wavelength dielectric cylinders, the field amplification occurs in the cylinders and can be explained by a constructive interference of scattered waves from each cylinder that occurs at the resonant frequency $\omega_0$. If the material of cylinders possesses a nonlinear dielectric susceptibility, then an amplification of optical nonlinear effects are possible.

As noted, in a double-array structure the resonance width can be controlled by varying the distance h in a vicinity of a critical value $h_b$ at which a bound state is formed. Some of the regions where the local field amplification $E_r \sim E_i/\sqrt{\Gamma(h)}$ occurs in the double array of dielectric cylinders coincide with positions of the cylinders. If $\chi_c$ is a second order nonlinear dielectric susceptibility, then the quantity $\chi_c E_r$ (that determines the second harmonic generation) can be made large despite the smallness of $\chi_c E_i$ by taking h close enough to its critical value $h_b$. This qualitative assessment should be taken with a precaution. A rigorous analysis of the scattering problem by means of the formalism of Siegert states (appropriately extended to periodic structures) shows that no divergence of a local field occurs as $h \to h_b$. The findings can be summarized as follows.

The analysis is based on the sub wavelength approximation, meaning that the incident wave length is larger than the radius R of cylinders. If k is the magnitude of the wave vector, then the theory has three small parameters:

$$\delta_0(k) = \frac{1}{4}(kR)^2(\varepsilon_c - 1) \ll 1,$$

$$\chi_c \ll 1,$$

$$|\Delta h| = |h - h_b| \ll 1$$

EQN. 7 where all the distances are measured in units of the structure period (i.e., R<1), $\delta_0(k)$ is the scattering phase for a single cylinder, $\in_c$ is a linear dielectric susceptibility, and the amplitude of the incident wave is set to one, $E_i=1$. With this choice of units, all three parameters are dimensionless. Nonlinear Maxwell's equations are solved by taking into account two nonlinear effects: a second harmonic generation in the leading order in $\chi_c$ and the fundamental harmonic generation by mixing the second and fundamental harmonics in the leading order in $\chi_c$ (the second order effect in $\chi_c$). The latter ensures the energy flux conservation. In particular for the normal incidence, the ratio of the flux of the second harmonic along the normal direction to the incident flux has been found to be:

$$\sigma_2 = C\chi_c^2 E_r^4$$

EQN. 8 where $E_r = E_r(\chi_c, \Delta h, \delta_0)$ is the field on the cylinders and $C=C(\delta_0, \Delta h)$ is some function. Due to a resonant nature of the scattering process, the function $E_r$ is non-analytic in the vicinity of zero values of their arguments so that that the conventional perturbative approach (based on a power series expansion) becomes inapplicable to analyze the conversion rate $\sigma_2$. A non-perturbative approach may be used to circumvent the problem. The generated flux of the second harmonic attains its maximal value when the small parameters satisfy the condition:

$$(\Delta h)^4 \delta_0^3(k_b) = \mu \chi_c^2$$

EQN. 9 where $\mu \ll 1$ is a numerical constant, and $k_b$ is the magnitude of the wave vector of the bound state that occurs at $h=h_b$. Under this condition, $\sigma_2$ becomes analytic in the scattering phase $\delta_0$ so that in the leading order, $$\sigma_{2,max} \approx 4\pi k_b^{-1} \delta_0(k_b).$$

EQN. 10

An interesting feature to note is the independence of the conversion efficiency of the nonlinear susceptibility $\chi_c$ (in the leading order in the scattering phase $\delta_0$). In other words, given a nonlinear susceptibility $\chi_c$, by fine tuning the distance between the arrays it is possible to reach the maximal value determined by the scattering phase at the wave length of a bound state. The largest value of $k_b$ for the system considered occurs just below the first diffraction threshold (the wavelength is slightly less than the structure period), i.e. $k_b \approx 2\pi$. Taking, for example, R=0.15 and $\in_c=2$ (so that $\delta_0(2\pi)$ 0.22), the conversion rate reads $\sigma_{2,max} \approx 0.44$, that is, about 44% of the incident flux is converted into the second harmonic flux, which is comparable with the conversion rate achieved in slabs (crystals) of optical nonlinear materials.

The following features of the proposed mechanism to generate higher harmonics are noteworthy. First, the need to fulfill the phase matching condition, which is necessary in optically nonlinear crystals, has been eliminated. The reason is that the second harmonic is generated in regions (cylinders) of dimensions much smaller than the wave length and, hence, the phase mismatch in propagation of the first and second harmonics due to the difference in the corresponding refraction indices does not even occur. Second, the process does not require focusing of the incident beam. Instead, if geometrical parameters of the system are set to maximize the conversion rate, the focusing occurs within the structure automatically and a conversion rate of about 40% is achieved, even though $\chi_c E_i \ll 1$ for the incident radiation. Third, the maximum value of the conversion rate depends weakly on the nonlinear susceptibility. This provides a possibility for frequency conversion of lower power light beams. Fourth, an active length at which the conversion rate is maximal is $2h_b$, whose smallest value for the system studied is roughly a half of the wave length of the incident light, while an effective conversion in a slab of an optical nonlinear material requires a length varying between a few millimeters to a few centimeters. This means that the conversion can effectively be done at nanoscales for visible light. These features may be attributed to the existence of resonances with the vanishing width or bound states in the radiation continuum for the scattering system studied, and would not be possible otherwise.

Referring back to FIG. 1A, scattering theory for the system is examined. Consider a system consisting of an infinite double array of parallel, periodically positioned cylinders 103. The cylinders are made of a nonlinear dielectric material with a linear dielectric constant $\in_c > 1$, and a second order susceptibility $\chi_c \ll 1$. For example, cylinder material may include, but is not limited to, lithium niobate or other appropriate dielectric material. The coordinate system is set so that the cylinders are parallel to the y-axis, the structure is periodic along the x-axis, and the z-axis is normal to the structure. The unit of length is taken to be the array period 109, and the distance between the two arrays 106 relative to the period is 2h. The three coordinate axes x, y, and z, are oriented by the unit vectors $\{e_1, e_2, e_3\}$. In the case when the structure is illuminated by a plane wave with electric field parallel to the cylinders (TM polarization), Maxwell's equations are reduced to the scalar wave equation, $$\frac{1}{c^2}\partial_t^2\left(\varepsilon E + \frac{\chi}{4\pi}E^2\right) = \Delta E \qquad \text{EQN. 11}$$

where the dielectric function $\in$ has a constant value $\in_c > 1$ on the dielectric cylinders, and equals 1 elsewhere. Similarly, the second order susceptibility $\chi$ takes a constant value $\chi_c \ll 1$ on the cylinders and 0 elsewhere. Due to the translation invariance of the scattering structure in the y-direction and the TM polarization, a solution to EQN. 11 is a function of x and z alone.

It is customary to assume that the solution E is analytic in $\chi_c$ so that higher harmonic effects may be studied through a power series expansion, $$E = 2\text{Re}\{E_1 e^{-i\omega t} + \chi_c E_2 e^{-2i\omega t} + \chi_c^2(E_{3,1} e^{-i\omega t} + E_{3,3} e^{-3i\omega t}) + \ldots\} \qquad \text{EQN. 12}$$

where $E_1$ is the amplitude of the fundamental harmonics in the zero order of $\chi_c$, $E_2$ is the amplitude of the second harmonics in the first order of $\chi_c$, and so on. Such a series is obtained by perturbation theory in $\chi_c$ which entails first solving EQN. 11 in the linear case ($\chi_c = 0$) to produce a solution $E_L$. The general solution E to the nonlinear wave equation is then sought in the form $E = E_L + E_{NL}$, where $E_{NL}$ is the correction due to nonlinear effects. If $\hat{G}$ is the Green's function of the operator $$\frac{\varepsilon}{c^2}\partial_t^2 - \Delta$$

with appropriate (scattering) boundary conditions, then, $$E_{NL} = -\frac{\chi_c}{4\pi c^2}\hat{G}[\eta \partial_t^2 (E_L + E_{NL})^2] \qquad \text{EQN. 13}$$

where the second order susceptibility $\chi$ has been written in the form $\chi = \chi_c \eta$ to isolate the perturbation parameter $\chi_c$. The function $\eta$ is simply the indicator function of the region occupied by the infinite double array, i.e., its value is 1 on any of the cylinders, and 0 elsewhere. A power series expansion for the correction $E_{NL}$ and, hence, for the full solution E is then obtained by the method of successive approximations.

According to scattering theory, the kernel of the Green's function $\hat{G}$ will be meromorphic in $$k^2 = \frac{\omega^2}{c^2}.$$

If the kernel has a real pole $k^2 = k_b^2 > 0$, it is not summable, and therefore the successive approximations produce a diverging series, thus indicating a non-analytic behavior of the solution in $\chi_c$. As is clarified shortly, real poles correspond to bound states in the radiation continuum so that the goal is to investigate the nonlinear wave equation (EQN. 11) in a small neighborhood real poles of the Green's function $\hat{G}$, which amounts to finding a non-analytical solution in $\chi_c$. This is a crucial difference between conventional treatments of optically nonlinear effects and the present study from both the physical and mathematical points of view. The conclusions summarized in Introduction stem directly from non-analyticity of the solution of the non-linear scattering problem in a spectral region that contains bound states in the radiation continuum.

In general, the problem is posed as a scattering problem. An incident radiation, $$E_{in}(r,t) = 2\cos(k \cdot r - \omega t), k = k_x e_1 + k_z e_3, ck = \omega, \qquad \text{EQN. 14}$$

is scattered by the double array of dielectric cylinders. The general solution to EQN. 11 should then be of the form, $$E(r, t) = \sum_{l=-\infty}^{\infty} E_l(r) e^{-il\omega t} \qquad \text{EQN. 15}$$

where $E_0 \equiv 0$, and for all l, $E_{-l}$ is the complex conjugate of $E_l$ (as E is real). Therefore it is sufficient to determine only $E_l$, $l \geq 1$. The amplitudes $E_l$ satisfy the Bloch's periodicity condition derived by requiring that the full solution E to the wave equation satisfies the same periodicity condition as the incident wave $E_{in}$, namely, $$E_{in}(r + e_1, t) = E_{in}\left(r, t - \frac{k_x}{\omega}\right) \qquad \text{EQN. 16}$$

It then follows that, $$E_l(r+e_1) = e^{ilk_x} E_l(r) \qquad \text{EQN. 17}$$

This is the Bloch's condition for the amplitude $E_l$. By EQN. 11, the amplitudes of different harmonics satisfy the equations, $$\Delta E_l + l^2 k^2 \varepsilon E_l = -\nu l^2 k^2 (\varepsilon - 1)\sum_p E_p E_{l-p}, \qquad \text{EQN. 18}$$

$$\nu = \frac{\chi_c}{4\pi(\varepsilon_c - 1)}$$

For ease of notation, the parameter v is often used in lieu of $\chi_c$. Whenever this is the case, it should be kept in mind that v is proportional to $\chi_c$, and is therefore very small.

The scattering theory requires that for $l \neq \pm 1$, the partial waves $E_l e^{-il\omega t}$ be outgoing in the spatial infinity ($|z| \to \infty$). The fundamental waves $E_{\pm 1} e^{\mp i\omega t}$ are a superposition of an incident plane wave $e^{\pm i(k \cdot r - \omega t)}$ and a scattered wave which is outgoing at the spatial infinity. In all, the above boundary conditions lead to a system of Lippmann-Schwinger integral equations for the amplitudes $E_l$:

$$\begin{cases} E_1 = \hat{H}(k^2)\left[E_1 + \nu \sum_p E_p E_{1-p}\right] + e^{ik \cdot r} \\ E_l = \hat{H}((lk)^2)\left[E_l + \nu \sum_p E_p E_{l-p}\right], \quad l \geq 2 \end{cases} \qquad \text{EQN. 19}$$

and $E_{-l} = \overline{E}_l$ for $l \leq -1$, where $\hat{H}(q^2)$ is the integral operator defined by the relation:

$$\hat{H}(q^2)[\psi](r) = \frac{q^2}{4\pi} \int (\varepsilon(r_0) - 1) G_q(r \mid r_0) \psi(r_0) dr_0 \qquad \text{EQN. 20}$$

in which $G_q(r|r_0)$ is the Green's function of the Poisson operator, $(q^2+\Delta)G_q(r|r_0)=4\pi\delta(r-r_0)$. For two spatial dimensions, as in the case considered here $r=(x,z)$ and $r_0=(x_0,z_0)$, the Green's function is known to be $G_q(r|r_0)=i\pi H_0(q|r-r_0|)$ where $H_0$ is the zero order Hankel function of the first kind.

When $v=0$, the amplitudes of all higher harmonics ($l \geq 2$) vanish. Therefore it is natural to assume that $|E_1|\gg|E_2|\gg|E_3|\gg \ldots$ for a small v. Note that this does not generally imply that the solution, as a function of v, is analytic at $v=0$. Under this assumption, the solution to the system (EQN. 19) can be approximated by keeping only the leading terms in each of the series involved. In particular, the first equation in EQN. 19 is reduced to $$E_1 \approx e^{ik \cdot r} + \hat{H}(k^2)[E_1] + 2v\hat{H}(k^2)[\bar{E}_1 E_2] \qquad \text{EQN. 21}$$

while the second equation becomes $$E_2 \approx \hat{H}((2k)^2)[E_2] + v\hat{H}((2k)^2)[E_1^2]. \qquad \text{EQN. 22}$$

It then follows that a first order approximation to the solution of the nonlinear wave equation (EQN. 11) may be found by solving the system formed by the EQNS. 21 and 22. To facilitate the subsequent analysis, the system is rewritten as $$\begin{cases} [1 - \hat{H}(k^2)][E_1] = e^{ik \cdot r} + 2v\hat{H}(k^2)[\bar{E}_1 E_2] \\ [1 - \hat{H}((2k)^2)][E_2] = v\hat{H}((2k)^2)[E_1^2] \end{cases} \qquad \text{EQN. 23}$$

The solution of the first of EQN. 23 involves inverting the operator $1-\hat{H}(k^2)$, and therefore necessitates a study of the poles of the resolvent $[1-\hat{H}(k^2)]^{-1}$. Such poles are generalized eigenvalues to the generalized eigenvalue problem, $$\hat{H}(k^2)[E] = E \qquad \text{EQN. 24}$$

for fixed $k_x$. The corresponding eigenfunctions $E=E_s$ are referred to as Siegert states. In contrast to Siegert states in quantum scattering theory, electromagnetic Siegert states satisfy the generalized eigenvalue problem (EQN. 24) in which the operator is a nonlinear function of the spectral parameter $k^2$. In general, for fixed h, a pole to the resolvent $[1-\hat{H}(k^2)]^{-1}$ will have the form $k_r^2(h)-i\Gamma(h)$. Scattered modes satisfy the condition $k > k_x$ (the radiation continuum). Hence, if $k_r(h) > k_x$, then, according to scattering theory, such a pole is a resonance pole. In the case of the linear wave equation, i.e., $\chi_c = v = 0$, the scattered flux peaks at $k=k_r(h)$ indicating the resonance position, whereas the imaginary part of the pole defines the corresponding resonance width (or a spectral width of the scattered flux peak; a small $\Gamma$ corresponds to a narrow peak). It appears that there is a discrete set of values of the distance $h=h_b$ at which the width of some of resonances vanishes, $\Gamma(h_b)=0$, that is, the resolvent $[1-\hat{H}(k^2)]^{-1}$ has a real pole at $k_b=k_r(h_b)>k_x$. The corresponding eigenfunctions (Siegert states) satisfying EQN. 24 are known as bound states in the radiation continuum. It is the presence of such states that makes the scattering problem defined by the system (EQN. 24) impossible to analyze for real k near $k_r(h_b)$ by expanding the solution into a power series in $\chi_c$. It should be noted that there exists another class of bound states in this system for which $k^2 < k_x^2$. These are bound states below the radiation continuum. Such states are not relevant for the present study, and henceforth, bound states are understood as bound states in the radiation continuum.

The objective of what follows is to show that if the parameters (h,k) of the system are chosen appropriately in the vicinity of a critical pair $(h_b,k_b)$ at which a bound state in the radiation continuum forms, a significant portion of the energy flux of the fundamental harmonics is transferred to second harmonics.

Note that as far as the second of EQN. 23 is concerned, it can generally be ensured that if $k_b^2$ is an eigenvalue of $\hat{H}$ for a bound state, then $(2k_b)^2$ is not an eigenvalue. Consequently, the operator $[1-\hat{H}((2k)^2)]^{-1}$ is regular in a neighborhood of $k_b^2$. On the other hand, the eigenvalues $k_b^2$ are isolated. Therefore for k close to, but not equal to, $k_b$, the operator $1-\hat{H}(k^2)$ is invertible. It then follows that $E_1$ satisfies the nonlinear integral equation, $$\begin{aligned} E_1 = (1-\hat{H}(k^2))^{-1}[e^{ik \cdot r} + 2v^2\hat{H}(k^2)[\\ \bar{E}_1(1-\hat{H}((2k)^2))^{-1}[\hat{H}((2k)^2)[E_1^2]]]] \end{aligned} \qquad \text{EQN. 25}$$

where, in accord with the notation introduced in EQN. 20, the function on which an operator acts is placed in the square brackets following the operator. The operator $v^2[1-\hat{H}((2k)^2)]^{-1}$ that determines the "nonlinear" part of EQN. 25 cannot be viewed as "small" when $k^2 \to k_b^2$ no matter how small $v^2 \sim \chi_c^2$ is, which precludes the use of a power series representation of the solution in $v^2$. The behavior of the solution of the integral equation (EQN. 25) will be analyzed for $k^2$ near $k_b^2$ in the limit of sub wavelength dielectric cylinders. In this limit, the action of the operator $\hat{H}$ will be proved to be determined by the action of a 2×2 matrix so that EQN. 25 becomes a system of two quadratic equations. The analysis of this system is considerably simplified by establishing first a particular property of the field ratio η defined as $$\eta(x,z) = \frac{E_1(x,-z)}{E_1(x,+z)} \qquad \text{EQN. 26}$$

As already noted, bound states or, more generally, Siegert states have a specific parity relative to the reflection $(x, z) \to (x,-z)$, i.e. they are either odd or even functions of z. This is an immediate consequence of the commutativity of the operator $\hat{H}$ and the parity operator $\hat{P}$ defined by $\hat{H}[E](x, z)=E(x,-z)$. Near a pole, the meromorphic expansion of the resolvent $[1-\hat{H}(k^2)]^{-1}$ has the form $$E_1 = \frac{iC(h)}{k^2 - k_r^2(h) + i\Gamma(h)} E_s + O(1) \qquad \text{EQN. 27}$$

where C(h) is some constant depending on h, and $E_s$ is an appropriately normalized Siegert state. Consider the curve of resonances $\mathcal{C}: k=k_r(h)$ in the (h,k)-plane. Along $\mathcal{C}$, $$E_1(x,z) = \frac{C(h)}{\Gamma(h)} E_s(x,z) + O(1) \qquad \text{EQN. 28}$$

Now, as $h \to h_b$, the width $\Gamma(h)$ goes to 0, and the Siegert state $E_s$ becomes a bound state $E_b$ in the radiation continuum. It then follows from EQN. 28 that if C(h) does not go to zero faster than $\Gamma(h)$ as $h \to h_b$, i.e. the pole still gives the leading contribution to $E_1$ in this limit, then $$\eta(x, z) \to \frac{E_b(x, -z)}{E_b(x, +z)} = \pm 1 \qquad \text{EQN. 29}$$

depending on whether the bound state $E_b$ is even or odd in z. In the case of the linear wave equation (v=0), the constant C(h) is shown to be proportional to $\sqrt{\Gamma(h)}$. Therefore, for a small v, the assumption that C(h) does not go to zero faster than $\Gamma(h)$ as $h \to h_b$ is justified.

The following approach is adopted to solve EQN. 25 near a bound state. First, the curve of resonances $\mathcal{C}$ in the (h,k)-plane is found. Next, the equation is solved in terms of the ratio $\eta$ with the pair (k,h) being on the curve $\mathcal{C}$. The principal part of the amplitude $E_1$ relative to $\Delta h = h - h_b$ is then evaluated near a critical point $(h_b, k_b)$ on $\mathcal{C}$ by taking $\eta$ to its limit value. This approach reveals a non-analytic dependence of the amplitude $E_1$ on the small parameters $\Delta h$ and $\chi_c$ of the system, which is crucial for the subsequent analysis of the second harmonic generation.

The sub wavelength approximation may be examined as follows. The action of the integral operator $\hat{H}(q^2)$ in EQN. 25 may be approximated in the limit of sub wavelength dielectric cylinders. The approximation is defined by a small parameter $$\delta_0(q) = \frac{(qR)^2}{4}(\varepsilon_c - 1) \ll 1 \qquad \text{EQN. 30}$$

which is the scattering phase of a plane wave with the wave-number q on a single cylinder of radius R. For sufficiently small R, this approximation is justified. In this approximation, the integral kernel of $\hat{H}(q^2)$ is defined by (EQN. 20) and has support on the region occupied by cylinders. The condition (EQN. 30) implies that the wavelength is much larger than the radius R, and therefore field variations within each cylinder may be neglected, $\psi(x, z) \approx \psi(n, \pm h)$ where $(n, \pm h)$ are positions of the cylinders. The integration in $\hat{H}(q^2)[\psi]$ yields an infinite sum over positions of the cylinders. By Bloch's condition, $\psi(n, \pm h) = e^{inq_x}\psi(0, \pm h)$, so that the function $\hat{H}(q^2)[\psi](x, z)$ is fully determined by only two values $\psi(0, \pm h)$. In particular, $$\hat{H}(q^2)[\psi](0, \pm h) \approx \alpha \psi(0, \pm h) + \beta \psi(0, \mp h) \qquad \text{EQN. 31}$$

where the coefficients $\alpha$ and $\beta$ are shown to be:

$$\alpha(q, q_x) = 2\pi i \delta_0(q) \left( \sum_{m=-\infty}^{\infty} \left( \frac{1}{q_{z,m}} - \frac{1}{2\pi i(|m|+1)} \right) + \frac{i}{\pi} \ln(2\pi R) \right) \qquad \text{EQN. 32}$$

$$\beta(q, q_x, h) = 2\pi i \delta_0(q) \sum_{m=-\infty}^{\infty} \frac{e^{2ihq_{z,m}}}{q_{z,m}} \qquad \text{EQN. 33}$$

where $q_{z,m} = \sqrt{q^2 - (q_x + 2\pi m)^2}$ with the convention that if $q^2 < (q_x + 2\pi m)^2$, then $q_{z,m} = i\sqrt{(q_x + 2\pi m)^2 - q^2}$. To obtain the energy flux scattered by the structure, the action of the operator $\hat{H}(q^2)$ on $\psi$ must be determined in the asymptotic region $|z| \to \infty$. It is found that for $|z| > h + R$, $$\hat{H}(q^2)[\psi](x, z) \approx \qquad \text{EQN. 34}$$

$$2\pi i \delta_0(q) \sum_{m=-\infty}^{\infty} (\psi(0, h)e^{i|z-h|q_{z,m}} + \psi(0, -h)e^{i|z+h|q_{z,m}}) \frac{e^{ix(q_x + 2\pi m)}}{q_{z,m}}$$

Now that the action of the operator $\hat{H}(q^2)$ has been established in EQNS. 31 and 34, the amplitudes $E_1$ and $E_2$ of the fundamental and second harmonics can be determined by solving the system (EQN. 23). As noted earlier, this will be done along a curve $\mathcal{C}$ in the (h,k)-plane defined by $k = k_r(h)$ where $k_r(h)$ is the real part of a pole of $[1 - \hat{H}(k^2)]^{-1}$, or equivalently, when the incident radiation has the resonant wave number $k = k_r(h)$. This curve is obtained by studying zeros of the determinant $\det[1 - \hat{H}(k^2)]$. With this purpose EQN. 24, that defines Siegert states, is written in the sub wavelength approximation according to the rule (EQN. 31), i.e. the action of $\hat{H}(k^2)$ is taken at the points $(0, \pm h)$. This produces the system, $$[1 - \mathcal{H}] \begin{pmatrix} E_{b+} \\ E_{b-} \end{pmatrix} = \begin{pmatrix} 0 \\ 0 \end{pmatrix}; \mathcal{H} = \begin{pmatrix} \alpha & \beta \\ \beta & \alpha \end{pmatrix} \qquad \text{EQN. 35}$$

where $E_{b\pm} = E_b(0, \pm h)$ and the functions $\alpha = \alpha(k, k_x)$ and $\beta = \beta(k, k_x)$ have been defined in the previously. In particular, bound states occur at the points $(h_b, k_b)$ at which the determinant $\det(1 - \mathcal{H})$ vanishes, $$\det \begin{pmatrix} 1-\alpha & -\beta \\ -\beta & 1-\alpha \end{pmatrix} = (1 - \alpha - \beta)(1 - \alpha + \beta) = 0 \qquad \text{EQN. 36}$$

It follows from EQN. 35 that the bound states for which $1 - \alpha - \beta = 0$ are even in z because $E_{b+} = E_{b-}$ in this case. Similarly, the bound states for which $1 - \alpha + \beta = 0$ are odd in z. More generally, the poles of the resolvent $[1 - \hat{H}(k^2)]^{-1}$ are complex zeros of $\det(1 - \mathcal{H})$. They are found by the conventional scattering theory formalism. Specifically, the resonant wave numbers $k^2 = k_r^2(h)$ are obtained by solving the equation $\text{Re}\{1 - \alpha \pm \beta\} = 0$ for the spectral parameter $k^2$. According to the convention adopted in the representation (EQN. 27), the corresponding resonance widths are defined by $$\Gamma(h) = -\frac{\text{Im}\{1 - \alpha \pm \beta\}}{\partial_{k^2} \text{Re}\{1 - \alpha \pm \beta\}} \bigg|_{k^2 = k_r^2(h)} \qquad \text{EQN. 37}$$

where $\partial_{k^2}$ denotes the derivative with respect to $k^2$. This definition of the width corresponds to the linearization of $\text{Re}\{1 - \alpha \pm \beta\}$ near $k^2 = k_r^2(h)$ as a function of $k^2$ in the pole factor $[1 - \alpha \pm \beta]^{-1}$. The curves of resonances $k = k_r(h) > 0$ come in pairs. There is a curve connecting the symmetric bound states and another curve connects the odd ones.

In what follows, only the curve connecting symmetric bound states will be considered. The other curve can be treated similarly. With reference to FIG. 10, the first symmetric bound state occurs when the distance 2h is about half the array period, while the skew-symmetric bound states emerge only at larger distances. The solution obtained near the first symmetric bound state corresponds to the smallest possible transverse dimension of the system (roughly a half of the wave length of the incident radiation) at which a significant enhancement of the second harmonic generation can be observed. Thus, from now on the curve of resonances $\mathcal{C}$ refers to the curve in the (h,k)-plane defined by the equation $\text{Re}\{1 - \alpha - \beta\} = 0$. To simplify the technicalities, it will be further assumed that only one diffraction channel is open for the fundamental harmonics, i.e. $k_x < k < 2\pi - k_x$. Note that bound states in the radiation continuum exist even if more diffraction channels are open, and the solution of the nonlinear scattering problem may also be obtained in their vicinity by the approach developed here.

Let $k=k_b(h)$ be a solution of $\text{Re}\{1-\alpha-\beta\}=0$. By making use of the explicit form of the functions $\alpha$ and $\beta$ for one open diffraction channel, one infers that along the curve $k=k_b(h)$:

$$1 - \alpha - \beta = i\text{Im}\{1 - \alpha - \beta\} = -i\frac{4\pi\delta_0(k_b)}{k_z}\varphi^2, \quad \text{EQN. 38}$$

$$\varphi = \cos(hk_z),$$

$$k_z = \sqrt{k_b^2 - k_x^2}$$

Bound states in the radiation continuum occur when the distance h satisfies the equation $\varphi=0$, i.e. $h\sqrt{k_r^2(h)-k_x^2}=(n-\frac{1}{2})\pi$ with n being a positive integer. Its solutions $h=h_b(n)$ define the corresponding values of the wave numbers of the bound states, $k_b(n)=k_b(h_b(n))$. So, the sequence of pairs $\{(h_b(n), k_b(n))\}_{n=1}^{\infty}$ indicates positions of the bound states on the curve $\mathcal{C}$. In the limit $h \to h_b(n)$ along $\mathcal{C}$, the function $\varphi$ has the asymptotic behavior:

$$\varphi=(-1)^n k_{z,b}\Delta h+o(\Delta h), k_{z,b}=k_z|_{h=h_{b(n)}}, \Delta h=h-h_b \quad \text{EQN. 39}$$

The objective is to determine the dependence of the amplitudes $E_1$ and $E_2$ on the parameters $\Delta h$ and $\chi_c$ which are both small, and, in particular, to investigate the outgoing flux of the second harmonics as a function of $\Delta h$ and $\chi_c$.

To this end, let $E_{1\pm}=E_1(0,\pm h)$ be the values of the field $E_1$ on the axes of the cylinders at $(0,\pm h)$, and $E_{2\pm}=E_2(0,\pm h)$ be the values of the field $E_2$ on the same cylinders. In the sub wavelength approximation, these values fully determine the scattered field as is shown later and, hence, have to be found first. Applying the rule (EQN. 31) to evaluate the action of the operator $\hat{H}(q^2)$ in the system (EQN. 23), the first equation of the latter becomes $$[1 - \mathcal{H}]\begin{pmatrix} E_{1+} \\ E_{1-} \end{pmatrix} = 2v\mathcal{H}\begin{pmatrix} \bar{E}_{1+}E_{2+} \\ \bar{E}_{1-}E_{2-} \end{pmatrix} + \begin{pmatrix} e^{+ihk_z} \\ e^{-ihk_z} \end{pmatrix} \quad \text{EQN. 40}$$

Similarly, the second of EQN. 23 yields, $$[1 - \mathcal{H}_2]\begin{pmatrix} E_{2+} \\ E_{2-} \end{pmatrix} = v\mathcal{H}_2\begin{pmatrix} E_{1+}^2 \\ E_{1-}^2 \end{pmatrix}, \mathcal{H}_2 = \mathcal{H}(2k, 2k_x) \quad \text{EQN. 41}$$

As stated above, the resolvent $[1-\hat{H}((2k)^2)]^{-1}$ is regular in a neighborhood of $k_b$ so that EQN. 41 can be solved for $E_{2\pm}$, which defines the latter as functions of $E_{1\pm}$. The substitution of this solution into EQN. 40 gives a system of two nonlinear equations for the fields $E_{1\pm}$. Adding these equations and replacing the field $E_{1-}$ by its expression $E_{1-}=\eta(0, h)E_{1+}$ in terms of the field ratio of EQN. 26 yields the following implicit relation between the field $E_{1+}$ and its amplitude $|E_{1+}|$:

$$E_{1+} = -\frac{\varphi}{\frac{v^2}{\zeta}|E_{1+}|^2 + \varphi^2\xi} \quad \text{EQN. 42}$$

where $\varphi=\cos(hk_z)$ and $$v = \frac{\chi_c}{4\pi(s_c - 1)}$$

are small and, in terms of the field ratio $\eta=\eta(0, h)$, the values of $\zeta$ and $\xi$ read:

$$\xi = i\frac{2\pi\delta_0(k)}{k_z}(1+\eta), \quad \text{EQN. 43}$$

$$\frac{1}{\zeta} = \left(1 + i\frac{4\pi\delta_0(k)}{k_z}\varphi^2\right)(a + b\eta^2 + \bar{\eta}(b + a\eta^2))$$

with a and b being defined by the relation:

$$[1 - \mathcal{H}_2]^{-1}\mathcal{H}_2 = \begin{pmatrix} a & b \\ b & a \end{pmatrix} \quad \text{EQN. 44}$$

In particular, $\zeta$ and $\xi$ are continuous functions of the field ratio $\eta$ and $\varphi$. It can be shown that if $\zeta_b$ and $\xi_b$ are the respective limits of $\zeta$ and $\xi$ as $h \to h_b$ along the curve of resonances $\mathcal{C}$, then these limits are nonzero. It follows then that EQN. 42 for $E_{1+}$ is singular in both $\eta$ and $\varphi$ when these parameters are small, i.e., in the limit $(\eta,\varphi) \to (0, 0)$. Furthermore, there is no way to solve the said equation perturbatively in either of the parameters. A full non-perturbative solution can be obtained using Cardano's method for solving cubic polynomials. Indeed, by taking the modulus squared of both sides of the equation, it is found that, $$X^3 + 2\frac{\varphi^2}{v^2}\text{Re}\{\zeta\xi\}X^2 + \frac{\varphi^4}{v^4}|\zeta\xi|^2 X - \frac{\varphi^2}{v^4}|\zeta|^2 = 0, \quad \text{EQN. 45}$$

$$X = |E_{1+}|^2.$$

The solution to this cubic equation may be obtained, where EQN. (24) admits a unique real solution so that there is no ambiguity on the choice of $E_{1+}$. In the vicinity of a point $(h_b,k_b)$ along the resonance curve $\mathcal{C}$, the field $E_{1+}$ is found to behave as, $$|E_{1+}| = \frac{|\Delta h|^{1/3}}{\chi_c}\tau(\Delta h, \chi_c) \quad \text{EQN. 46}$$

Recall that $\Delta h=h-h_b$. An explicit form of the function $\tau(\Delta h, \chi_c)$ may be derived. It involves combinations of the square and cube roots of functions in $\Delta h$ and $x$, and has the property that $\tau(\Delta h,\chi_c) \to 0$ as $(\Delta h,\chi_c) \to (0, 0)$ (in the sense of the two-dimensional limit). In the limit $h \to h_b$, the field ratio $\eta$ approaches 1 for a symmetric bound state as argued earlier. Therefore it follows from EQN. 41 that $E_{2\pm} \sim vE_{1+}^2$ because the matrix (EQN. 44) exists at $h=h_b$. Since $v \sim \chi_c$, relation (EQN. 43) leads to the conclusion that:

$$\frac{E_{2\pm}}{E_{1+}} = O(|\Delta h|^{1/3}) \quad \text{EQN. 47}$$

Thus, the approximation $|E_1| \gg |E_2|$ used to truncate the system (EQN. 23) remains valid for h close to the critical value $h_b$ despite of non-analyticity of the amplitudes at $(\Delta h,\chi_c)=(0, 0)$.

The conversion efficiency may be examined using flux analysis. For the nonlinear system considered, even though Poynting's theorem takes a slightly different form as compared to linear Maxwell's equations, the flux conservation for the time averaged Poynting vector holds. The scattered energy flux carried across a closed surface by each of the different harmonics adds up to the incident flux across that surface. Consider a closed surface that consists of four faces, $$L_{\pm} = \left\{ (x, z) \,\Big|\, -\frac{1}{2} \le x \le \frac{1}{2}, z \to \pm 1/2 \right\}$$

and $L_{\pm 1/2} = \{(x,z)|x=\pm\frac{1}{2}\} L \pm \frac{1}{2} = \{(x, z)|x=\pm\frac{1}{2}\}$ as depicted in FIG. 1B. The scattered flux of each $l^{th}$-harmonics across the union of the faces $L_{\pm 1/2}$ vanishes because of the Bloch condition (and so does the incident flux for any $k_x$). Therefore only the flux conservation across the union of the faces $L_{\pm}$ has to be analyzed. If $\sigma_l$ designates the ratio of the scattered flux carried by the $l^{th}$-harmonics across the faces $L_{\pm}$ to the incident flux across the same faces, then $\Sigma_{l\le 1}\sigma_l = 1$. Thus, for $l\ge 2$, $\sigma_l$ defines the conversion ratio of fundamental harmonics into the $l^{th}$-harmonics.

In the perturbation theory used here, only the ratios $\sigma_1$ and $\sigma_2$ may be evaluated. It can be shown that $\sigma_1 + \sigma_2 \le 1$. Hence, the efficiency of converting the fundamental harmonic into the second harmonic is simply determined by the maximum value of $\sigma_2$ as a function of the parameter h at a given value of the nonlinear susceptibility $\chi_c$.

The ratio $\sigma_2$ is defined in terms of the scattering amplitudes of the second harmonic, i.e. by the amplitude of $E_2$ in the asymptotic region $|z| \to \infty$:

$$E_2(r) \to \begin{cases} \sum_{m^{op,sh}} R_m^{sh} e^{ir \cdot k_{m,sh}^-}, & z \to -\infty \\ \sum_{m^{op,sh}} T_m^{sh} e^{ir \cdot k_{m,sh}^+}, & z \to +\infty \end{cases} \quad \text{EQN. 48}$$

where $k_{m,sh}^{\pm} = (2k_x + 2\pi m)e_1 \pm k_{z,m}^{sk} e_3$ is the wave vector of the second harmonic in the $m^{th}$ open diffraction channel. Recall that the $m^{th}$ channel is open provided $(2k)^2 > (2k_x + 2\pi m)^2$ and in this case $k_{z,m}^{sh} = \sqrt{(2k)^2 - (2k_x + 2\pi m)^2}$, while if the channel is closed, then $k_{z,m}^{sh} = i\sqrt{(2k_x + 2\pi m)^2 - (2k)^2}$. In the asymptotic region $|z| \to \infty$, the field in closed channels decays exponentially and, hence, the energy flux can only be carried in open channels to the spatial infinity. The summation in EQN. 48 is taken only over those values of m for which the corresponding diffraction channel is open for the second harmonic, which is indicated by the superscript "op,sh" in the summation index $m^{op,sh}$. Note that there is more than one open diffraction channel for the second harmonic even though only one diffraction channel is open for the fundamental one. For instance, if the x-component of the wave vector k, i.e. $k_x$, is less than $$\frac{\pi}{2},$$

there are 3 open diffraction channels for the second harmonic, the channels m=0, m=−1, and m=1. These three directions of the wave vector of the second harmonic propagating in each of the asymptotic regions z−±∞ are depicted in FIG. 1B by double-arrow rays. Thus, in terms of the scattering amplitudes introduced in EQN. 48, the ratio of the second harmonic flux across $L_{\pm}$ to the incident flux is:

$$\sigma_2 = \frac{1}{2k_z} \sum_{m^{op,sh}} k_{z,m}^{sh}(|R_m^{sh}|^2 + |T_m^{sh}|^2). \quad \text{EQN. 49}$$

The scattering amplitudes $R_m^{sh}$ and $T_m^{sh}$ may be inferred from EQN. 22 in which the rule (EQN. 34) is applied to calculate the action of the operator $\hat{H}((2k)^2)$ in the far-field regions $|z| \to \infty$:

$$\begin{cases} R_m^{sh} = \frac{2\pi i \delta_0(2k)}{k_{z,m}^{sh}} \left[ (E_{2+} + \nu E_{1+}^2) e^{ihk_{z,m}^{sh}} + (E_{2-} + \nu E_{1-}^2) e^{-ihk_{z,m}^{sh}} \right] & \text{EQN. 50} \\ T_m^{sh} = \frac{2\pi i \delta_0(2k)}{k_{z,m}^{sh}} \left[ (E_{2+} + \nu E_{1+}^2) e^{-ihk_{z,m}^{sh}} + (E_{2-} + \nu E_{1-}^2) e^{ihk_{z,m}^{sh}} \right]. \end{cases}$$

Since $\eta \to 1$ as $h \to h_b$ along $\mathcal{C}$, the principal part of $\sigma_2$ in a vicinity of a bound state along the curve $\mathcal{C}$ is obtained by setting $E_{1-} = E_{1+}$ in EQN. 41, solving the latter for $E_{2\pm}$, and substituting the solution into the expression for $\sigma_2$. The result reads:

$$\sigma_2 = C_b v^2 |E_{1+}|^4 \quad \text{EQN. 51}$$

where $C_b$ is a constant obtained by taking all nonsingular factors in the expression of $\sigma_2$ to their limit as $h \to h_b$, which gives $$C_b = \left[ \frac{(16\pi\delta_0(k))^2}{k_z} |1 + a + b|^2 \sum_{m^{op,sh}} \frac{\cos^2(hk_{z,m}^{sh})}{k_{z,m}^{sh}} \right]_{(h,k)=(h_b,k_b)} \quad \text{EQN. 52}$$

for a and b defined in EQN. 44. Using the identity $|E_{1+}|^4 = |E_{1+}|^2 |E_{1+}|^2$ and substituting EQN. 42 into one of the factors $|E_{1+}|^2$, the conversion ratio $\sigma_2$ is expressed as a function of a single real variable, $$\sigma_2(u) = C_b' \frac{u}{|u + \zeta_b \xi_b|^2}, \quad u = \left(\frac{\nu |E_{1+}|}{\varphi}\right)^2 \quad \text{EQN. 53}$$

where $C_b^t = C_b |\zeta_b|^2$ is a constant, and $\xi$ and $\zeta$ in EQN. 43 have been taken at their limits as $h \to h_b$ to obtain the principal part of $\sigma_2$. The function $u \to \sigma_2(u)$ on $[0, \infty)$ is found to attain its absolute maximum at $u = |\xi_b \zeta_b|$. This condition determines the distance 2h between the arrays at which the conversion rate is maximal for given parameters R, $\in_c$ and $\chi_c$ of the system. Indeed, since $u \sim |E_{1+}|^2$ should also satisfy the cubic equation (EQN. 45), the substitution of $u = |\xi_b \zeta_b|$ into the latter yields the condition $$\frac{\nu^2}{\varphi^4} = 2|\xi_b|^2 (|\xi_b \zeta_b| + Re\{\xi_b \zeta_b\}) \quad \text{EQN. 54}$$

In particular, in the leading order in $\delta_0(k)$, the optimal distance 2h between the two arrays is given by the formula, $$(h - h_b)^4 = \frac{\chi_c^2}{8\pi^5 k_{z,b}(k_b R)^6 (\varepsilon_c - 1)^5} \quad \text{EQN. 55}$$

where as previously, $k_{z,b} = \sqrt{k_b^2 - k_x^2}$.

Figure 2A:
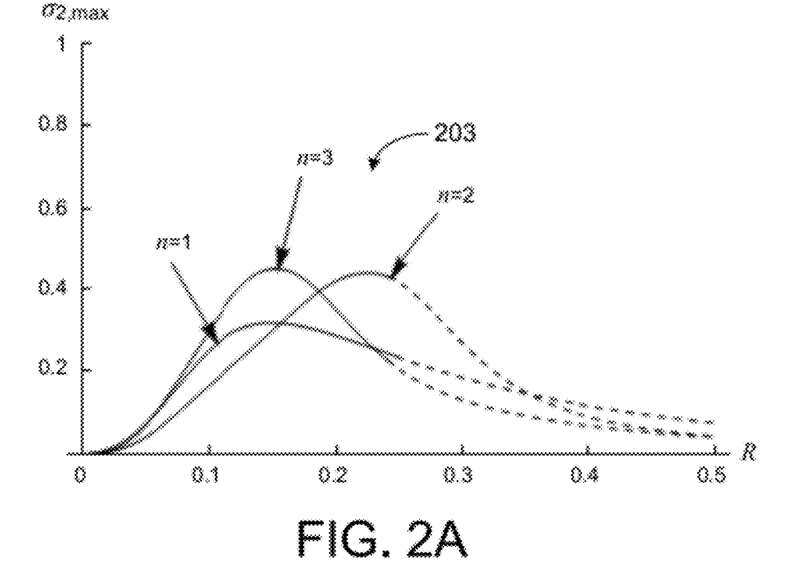
FIGS. 2A-2C are plots illustrating the efficiency of second harmonic generation utilizing the double array of FIG. 1A in accordance with various embodiments of the present disclosure.
Figure 2B:
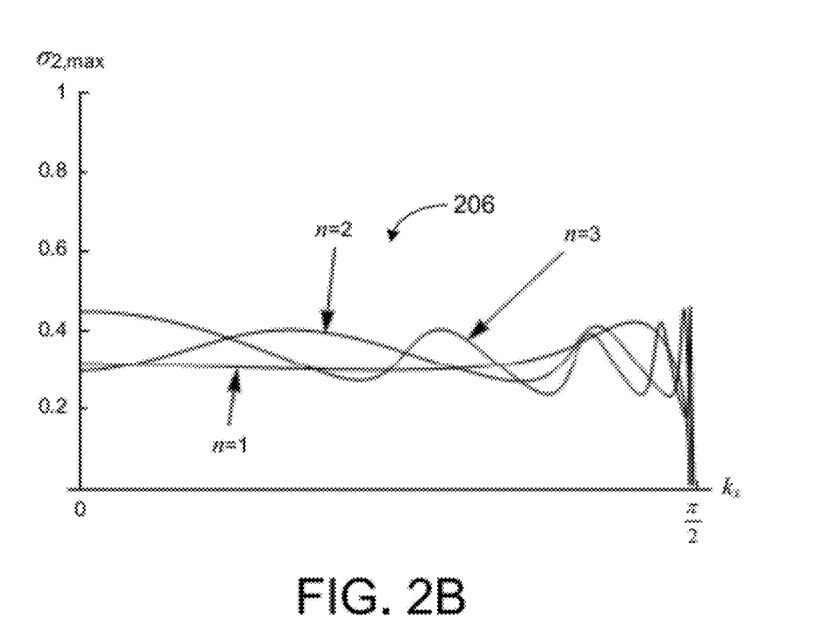
Figure 2C:
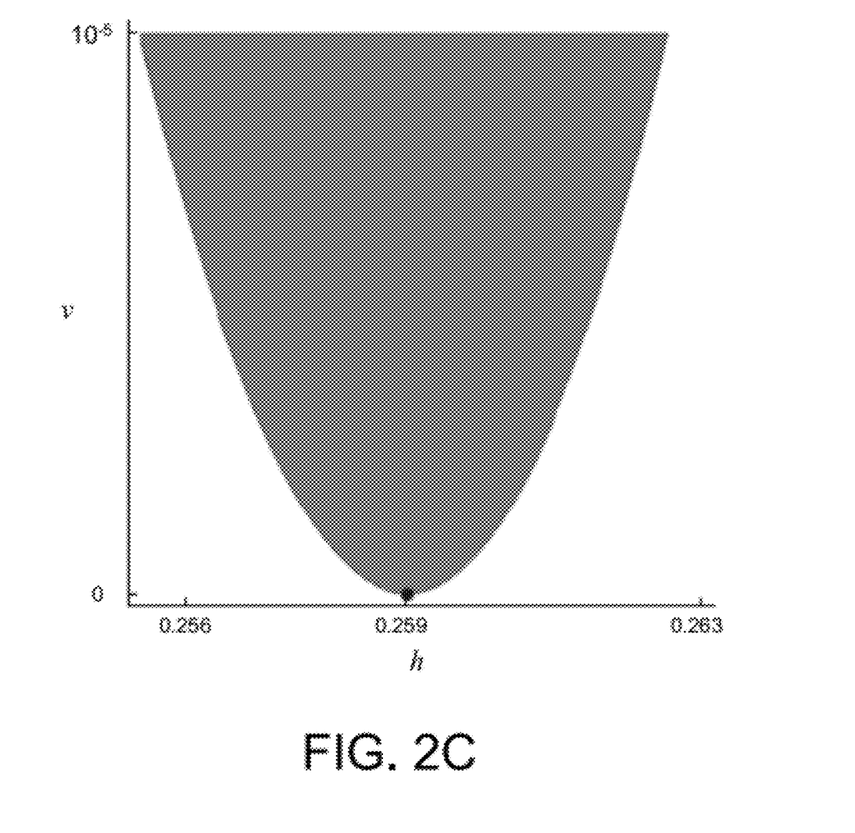

The maximum value $\sigma_{2,max}$ of the conversion ratio $\sigma_2$ is the sought-for conversion efficiency. Note that $\sigma_{2,max} = \sigma_2(|\xi_b \zeta_b|)$ is independent of the nonlinear susceptibility $\chi_c$ because the constants $C'_b$, $\xi_b$, and $\zeta_b$ are fully determined by the position of the bound state $(k_b, h_b)$. In other words, if the distance between the arrays is chosen to satisfy the condition (EQN. 55), the conversion efficiency $\sigma_{2,max}$ is the same for a wide range of values of the nonlinear susceptibility $\chi$c. This conclusion follows from two assumptions made in the analysis. First, the sub wavelength approximation should be valid for both the fundamental and second harmonics, i.e. the radius of cylinders should be small enough. Second, the values of $h - h_b$ and $v$ (or $x_c$) must be such that the analysis of the existence and uniqueness of $|E_{1+}|$ holds, that is, EQN. 45 should have a unique real solution under the condition (EQN. 55). The geometrical and physical parameters of the studied system can always be chosen to justify these two assumptions as illustrated in FIGS. 2A-2C. A detailed derivation is provided in Appendix A, entitled "The resonant nonlinear scattering theory with bound states in the radiation continuum and the second harmonic generation," which is hereby incorporated by reference in its entirety.

Referring now to FIGS. 2A-2C, shown are examples of plots illustrating the efficiency of second harmonic generation utilizing the double array 100 of sub wavelength dielectric cylinders 103 of FIG. 1A in accordance with various embodiments of the present disclosure. FIG. 2A shows the maximal efficiency $\sigma_{2,max}$ as function of R for the case of normal incidence ($k_x = 0$). The three curves 203 corresponds to three first critical values $h_b$ (i.e., the three first solid dots 121 from the left on the curve 118 in FIG. 1C) and $\in_c = 1.5$. The dashed regions on the curves 203 indicate regions where the dipole approximation $kR \ll 1$ used in the analysis was not justified. As one can see, the maximum convergence above 40% occur for values of the radius at which the approximation $kR \ll 1$ is well justified. FIG. 2B shows three curves 206 for the maximum efficiency as a function of $k_x$ (not normal incidence) for the same three first critical values $h_b$ with $R = 0.15$ and $\in_c = 1.5$. As can be seen, the conversion rate of between 35% and 40% can be achieved for a wide range of incident angles. FIG. 2C shows a shaded region of values $(v, h)$, where $v = \chi_2 / [4\pi(\in_c 6 - 1)]$ for which the presented analysis is valid near the second critical value $h_b$ and the normal incidence ($k_x = 0$). The regions of validity look for other critical values of $h$ look very similar. The found value of $h$ near $h_b$ at which the efficiency $\sigma_2$ attains its maximal value lies within the shadowed region.

Referring to FIGS. 2A and 2B, shown is the conversion efficiency $\sigma_{2,max}$ for three first symmetric bound states $n = 1, 2, 3$, as, respectively, a function of the cylinder radius R when $k_x = 0$ and of $k_x$ when $R = 0.15$. For all curves presented in the panels, $\in_c = 1.5$. The values of $\sigma_{2,max}$ are evaluated numerically by EQN. 53 where $u = |\xi_b \zeta_b \zeta|$. The solid parts of the curves in FIG. 2A correspond to the scattering phase $\delta_0(k) < 0.25$ with $k = k_b$. Note that the wavelength at which the second harmonic generation is most efficient is the resonant wavelength defined by $k = k_r(h)$ where $h$ satisfies the condition (EQN. 55). For a small $\chi_c$, the scattering phase at the resonant wavelength can well be approximated as $\delta_0(k) \approx \in_0(k_b)$. The condition $\delta_0(k_b) < 0.25$ ensures that the scattering phase for the second harmonic satisfies the inequality $\delta_0(2k_b) = 4\delta_0(k_b) < 1$ otherwise the validity of the sub wavelength approximation cannot be justified. The dashed parts of the curves in FIG. 2A correspond to the region where $\delta_0(k_b) > 0.25$. FIGS. 2A and 2B show that the conversion efficiency can be as high as 40% for a wide range of the incident angles and values of the cylinder radius. Such a conversion efficiency is comparable with that achieved in optically nonlinear crystals at a typical beam propagation length (active length) of a few centimeters, whereas here the transverse dimension 2h of the system studied here can be as low as a half of the wavelength, i.e. for an infrared incident radiation, 2h is about a few hundred nanometers. Indeed, as one see in FIG. 1C, the first bound state occurs at $h_b(1) \approx 0.259$ and $k_b \approx 2\pi$ which corresponds to the wavelength $\lambda_b\_b = 2\pi / k_b \approx 1$.

The stated conversion efficiency can be fairly well estimated in the leading order of $\delta_0(k)$:

$$\sigma_{2,max} = \sigma_2(|\zeta_b \xi_b|) \approx 8\pi \delta_0(k) \sum_{m^{op,sh}} \left. \frac{\cos^2(hk_{z,m}^{sh})}{k_{z,m}^{sh}} \right|_{(h,k)=(h_b,k_b)} \quad \text{EQN. 56}$$

Suppose that only one diffraction channel is open for the incident radiation. Then $m = 0, \pm 1$ in EQN. 56 (three open channels for the second harmonics). Let $\sigma_{2,max}^0$ denote the term $m = 0$, i.e. $\sigma_{2,max}^0$ is the second harmonic flux in which the contribution of the channels with $m = \pm 1$ is omitted, $\sigma_{2,max}^0 < \sigma_{2,max}$. One can infer from EQN. 56 that:

$$\sigma_{2,max}^0 \approx \frac{4\pi \delta_0(k_b)}{k_{z,b}} \cos^2(2h_b k_{z,b}) \quad \text{EQN. 57}$$

As the pair $(h_b, k_b)$ at which a symmetric bound state is formed satisfies the equation $\cos(h_b k_{z,b}) = 0$, it follows that $\cos(2h_b k_{z,b}) = -1$. Hence, $$\sigma_{2,max}^0 \approx \frac{k_b^2}{k_{z,b}} \pi R^2 (\varepsilon_c - 1) \quad \text{EQN. 58}$$

The wavenumbers $k_b$ at which the bound states occur lie just below the diffraction threshold $2\pi - k_b$, i.e., $k_b \geq 2\pi - k_x$ (see FIG. 1C). So that in the case of normal incidence ($k_x = 0$), the above estimate becomes, $$\sigma_{2,max}^0 \approx 2\pi (\pi R^2)(\in_c - 1) \quad \text{EQN. 59}$$

with $\delta_0(2\pi) \ll 1$. If, for instance, $R = 0.15$ and $\in_c = 2$, then, $$\sigma_{2,max}^0 \approx 44\%, \quad \text{EQN. 60}$$

for $\delta_0(2\pi) \approx 0.22$.

Apart from the exact numerical results presented in FIGS. 2A and 2B, the main properties of the proposed system to generate higher harmonics can also be understood in the leading order of the dipole (or sub wavelength) approximation. In the approximation, the maximum value of the efficiency is found to be $$\sigma_{2,max} \approx \pi k_b R^2 (\in_c - 1) \quad \text{EQN. 61}$$

Note that the maximum value of $\sigma_2$ appears independent of the non-linear susceptibility. This proves that the conversion efficiency depends weakly on the nonlinear susceptibility, i.e., only through higher orders of the dipole approximation. The only assumption used to prove this fact is that $\chi_c > 0$ (i.e., some small positive number). This is rather counterintuitive and in a drastic contrast with the conventional approach to the second harmonic generation where $\sigma_2$ is always proportional to $(\chi_c E_i)^2$, where $E_i$ is the amplitude of the incident wave. As a point of fact, the efficiency $\sigma_2$ in the proposed approach is proved to have a similar structure, namely, $$\sigma_2 \phi (\chi_2 E_r)^2 \qquad \text{EQN. 62}$$

where $\phi = \phi(R, h)$ is some numerical factor that depends on h, R, and $\in_c$, and $E_r$ is the electric field on the cylinders (i.e., not the amplitude of the incident wave). This is what makes so much difference with the conventional approach. From the point of view of the resonant scattering theory, it also makes a perfect sense.

First, as noted above, $E_r = E_i/\sqrt{\Gamma(h)}$. So, as h approaches a critical value $h_b$, the width $\Gamma(h)$ tends to zero and the field $E_r$ diverges. The system exhibits much needed focusing to amplify non-linear effects, and no special efforts are required to achieve the focusing in full contrast to the conventional case. Second, the physical (or observed) quantity is the flux of scattered light (or the power transmitted across unit area in a specified direction). It remains finite despite the divergence of $E_r$. This happens because the function $\phi(R, h)$ vanishes as h approaches $h_b$ at a faster rate than $E_r$ diverges, so that $\sigma_2$ remains finite near $h = h_b$ and attains its maximum value at h near $h_b$ as defined in EQN. 6. Third, the value of $h = h_{max}$ at which the maximum of $\sigma_2$ occurs depends on $\chi_c$, $h_{max} = h_{max}(\chi_c)$ so that $\sigma_2 \sim \chi_c^2/\Gamma(h_{max}(\chi_c))$ is independent of $\chi_c$ in the leading order of the dipole approximation or, generally, depends weakly on it as the leading order gives a dominant contribution to the conversion efficiency for the specified geometrical parameters of the system.

Furthermore, as illustrated in FIG. 1C, $k_b$ are close to $2\pi$ ($6.05 < k_b < 2\pi \approx 6.28$). For typical transparent materials $\in \approx 2$. Taking $k_b = 2\pi$, $\in_c = 2$, and R=0.15 (in units of the structure period), for which the dipole approximation is well justified, as noted above the conversion efficiency reads:

$$\sigma_{2,max} \approx 2\pi(\pi R^2)(\in_c - 1) \cdot 100\% = 44\% \qquad \text{EQN. 63}$$

Thus, the system exhibits efficiencies consistent with the conventional one, but in contrast to the latter the conversion occurs at distances of order of the wavelength of the incident light. The wavelength is typically of order 1000 nm or $10^{-3}$ mm versus a typical length of a 10 mm crystal used in the conventional way to generate higher harmonics. There is a distance between two periodic arrays (as described above) at which the second harmonic generation is significantly amplified and reaches or exceeds the level achieved in slabs (crystals) of optically nonlinear materials with a size of about 20 to 30 mm along the beam propagation direction that are currently used in industry. This distance is proved to be of the order of a wavelength of the resonant frequency, thus making the size of the structure along the beam propagation direction about 10000 times smaller than the typical size of crystals.

Compared to conventional use of crystal slabs used to generate the second harmonic, the following advantages have been illustrated. The phase matching condition has been eliminated. The reason is that the second harmonic is generated in regions of the cylinders of dimensions much smaller than the wave length and, hence, the phase mismatch in propagation of the first and second harmonics does not even occur. Focusing of the incident beam is not needed. If geometrical parameters of the system are set to maximize the conversion rate, the focusing occurs within the structure automatically. The maximum value of the conversion rate depends weakly on the nonlinear susceptibility in the sense explained above. So materials with smaller values of the nonlinear susceptibility may be used to achieve the effect. Additionally, this feature provides a possibility for the frequency conversion of lower power light beams, a non-existing option in the conventional approaches. The active length at which the conversion rate is maximal is of the order of the wavelength of the incident beam, reducing it by roughly $10^4$ times. Thus, in contrast to the conventional way to generate higher harmonics, the active length lies in the nanoscale range for visible and infrared light, allowing for miniaturization of devices for higher harmonic generation. The disclosed system allows for a controlled enhancement of local field amplitudes by pairing two nanoscale periodic arrays at specific distances.

Other forms of double periodic structures may also be used to enhance and control nonlinear optical phenomena at the nanoscale. While the effects of a double array of cylinders have been described, other periodic structures, such as periodically structured planar (film-like) structures, when paired at a certain distance can exhibit similar optical properties as those described for the double arrays of cylinders. This distance, at which the enhancement is maximal, depends on the planar structure geometry. Thus, the pairing of such periodic structures at a specific distance can significantly enhance optically nonlinear effects such as, e.g., higher (second) harmonic generation.

Further, the relative position of the double arrays of cylinders may be adjustable. For example, microelectromechanical systems may be used to displace the parallel arrays of cylinders 106 (FIG. 1) to adjust the distance 109 (FIG. 1) between the arrays. One or both of the parallel arrays of cylinders 106 may be mounted on a moveable structure that may be moved to control the distance 2h 106 between the arrays. In this way, the structure may be tuned for input and/or output characteristics. In some implementations, output sensors may be used to determine one or more characteristics of the output of the system, which may be used by control circuitry and/or a processor to adjust the structure to provide the desired results.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A system for generation of a higher harmonic of monochromatic electromagnetic radiation, comprising:

a double array of sub wavelength dielectric cylinders, comprising:
- a first array of periodically spaced parallel nanoscale cylinders, the periodic spacing corresponding to a resonant frequency; and
- a second array of periodically spaced parallel nanoscale cylinders, the second array in parallel with the first array; and
- a source configured to illuminate the first array with a beam of monochromatic electromagnetic radiation at the resonant frequency to produce a higher harmonic of the monochromatic electromagnetic radiation with a conversion efficiency of about 40% or more.

2. The system of claim 1, wherein the frequency of the higher harmonic of the monochromatic electromagnetic radiation is twice the resonant frequency.

3. The system of claim 1, wherein the periodic spacing is about a wavelength that corresponds to the resonant frequency.

4. The system of claim 1, wherein the second array is separated from the first array by about a wavelength that corresponds to the resonant frequency.

5. The system of claim 1, wherein the nanoscale cylinders are made of a nonlinear dielectric material.

6. The system of claim 5, wherein the nonlinear dielectric material comprises a linear dielectric constant $\in_c > 1$ and a second order susceptibility $\chi_c \ll 1$.

7. A system for generation of a higher harmonic of monochromatic electromagnetic radiation, comprising:
- a double array of planar array structures, comprising:
  - a first planar array structure comprising periodically spaced three-dimensional nanoscale elements, the first planar array structure having a periodic spacing corresponding to a resonant frequency; and
  - a second planar array structure comprising periodically spaced three-dimensional nanoscale elements, the second planar array structure in parallel with the first planar array structure; and
- a source configured to illuminate the first planar array structure with a beam of monochromatic electromagnetic radiation at the resonant frequency to produce a higher harmonic of the monochromatic electromagnetic radiation with a conversion efficiency of about 40% or more.

8. The system of claim 7, wherein the second planar array structure is separated from the first planar array structure by about a wavelength that corresponds to the resonant frequency.

9. The system of claim 7, wherein the second planar array structure is separated from the first planar array structure by less than a wavelength that corresponds to the resonant frequency.

10. The system of claim 7, wherein the frequency of the higher harmonic of the monochromatic electromagnetic radiation is twice the resonant frequency.

11. The system of claim 7, wherein a distance between the first and second planar array structures is adjustable.

12. The system of claim 7, wherein the double array of planar array structures comprises a double array of dielectric cylinders.

13. A method for generation of a higher harmonic of monochromatic electromagnetic radiation, comprising:
- directing a beam of monochromatic electromagnetic radiation at a resonant frequency at a double array of planar array structures, the double array of planar array structures comprising:
  - a first planar array structure comprising periodically spaced three-dimensional nanoscale elements, the first structure having a periodic spacing corresponding to a resonant frequency; and
  - a second planar array structure comprising periodically spaced three-dimensional nanoscale elements, the second structure in parallel with the first structure; and
- generating the higher harmonic of the monochromatic electromagnetic radiation with a conversion efficiency of about 40% or more.

14. The method of claim 13, further comprising adjusting a distance between the first and second planar array structures.

15. The method of claim 14, further comprising sensing generated monochromatic electromagnetic radiation, wherein the distance between the first and second planar array structures is adjusted based at least in part upon the sensed monochromatic electromagnetic radiation.

16. The method of claim 13, further comprising focusing the beam of monochromatic electromagnetic radiation on the first planar array structure.

17. The method of claim 13, wherein the double array of planar array structures comprises a double array of dielectric cylinders.

18. The method of claim 17, wherein the cylinders are made of a nonlinear dielectric material.

19. The method of claim 13, wherein the frequency of the higher harmonic of the monochromatic electromagnetic radiation is twice the resonant frequency.

* * * * *